(12) United States Patent
Lee et al.

(10) Patent No.: US 11,380,898 B2
(45) Date of Patent: *Jul. 5, 2022

(54) ELECTROLYTIC COPPER FOIL FOR SECONDARY BATTERY AND METHOD FOR PRODUCING THE SAME

(71) Applicant: ILJIN MATERIALS CO., LTD., Iksan (KR)

(72) Inventors: Sun Hyoung Lee, Iksan (KR); Tae Jin Jo, Iksan (KR); Seul-Ki Park, Iksan (KR); Ki Deok Song, Iksan (KR)

(73) Assignee: ILJIN MATERIALS CO., LTD., Iksan-si (KR)

(*) Notice: Subject to any disclaimer, the term of this patent is extended or adjusted under 35 U.S.C. 154(b) by 147 days.

This patent is subject to a terminal disclaimer.

(21) Appl. No.: 16/343,500

(22) PCT Filed: Mar. 28, 2017

(86) PCT No.: PCT/KR2017/003360
§ 371 (c)(1),
(2) Date: Apr. 19, 2019

(87) PCT Pub. No.: WO2018/088642
PCT Pub. Date: May 17, 2018

(65) Prior Publication Data
US 2019/0334177 A1    Oct. 31, 2019

(30) Foreign Application Priority Data
Nov. 11, 2016  (KR) .................. 10-2016-0150350

(51) Int. Cl.
*H01M 4/66*   (2006.01)
*C25D 1/04*   (2006.01)
*C25D 17/12*  (2006.01)

(52) U.S. Cl.
CPC .............. *H01M 4/661* (2013.01); *C25D 1/04* (2013.01); *C25D 17/12* (2013.01)

(58) Field of Classification Search
CPC ...... H01M 4/661; H01M 4/0404; C25D 1/04; C25D 17/12; C25D 3/38; Y02E 60/10; C22C 9/00; Y02P 70/50
See application file for complete search history.

(56) References Cited

U.S. PATENT DOCUMENTS 5,958,209 A    9/1999  Sakai et al.
7,258,951 B2 * 8/2007  Woo ............... H01M 4/661
                                        429/245

(Continued)

FOREIGN PATENT DOCUMENTS

JP    WO2014/119583 A1    8/2014
JP    2016-125120 A        7/2016

(Continued)

*Primary Examiner* — Bethany L Martin
*Assistant Examiner* — Kourtney R S Carlson
(74) *Attorney, Agent, or Firm* — Patent Office of Dr. Chung Park

(57) ABSTRACT

The present invention relates to an electrolytic copper foil for a secondary battery and a method of producing the same, and more particularly, to an electrolytic copper foil for a secondary battery, which has little change in a physical property of a copper foil before and after vacuum drying in a process of producing an electrolytic copper foil, thereby exhibiting excellent cycle life in a battery test at a high-density negative electrode, and preventing cracking. The electrolytic copper foil for a secondary battery is produced from a plating solution containing Total Organic Carbon (TOC), zinc, and iron by using a drum, in which a ratio of the TOC to the zinc and the iron contained in the electrolytic copper foil follows Formula 1 below:

TOC/(zinc+iron)=1.3 to 1.5        Formula 1

10 Claims, 1 Drawing Sheet

(56) References Cited

U.S. PATENT DOCUMENTS

| | | | |
|---|---|---|---|
| 2007/0287020 A1* | 12/2007 | Saito | C25D 1/04 |
| | | | 428/606 |
| 2014/0199588 A1 | 7/2014 | Shinozaki et al. | |
| 2015/0318530 A1* | 11/2015 | Yushin | H01M 4/366 |
| | | | 429/131 |

FOREIGN PATENT DOCUMENTS

| | | | |
|---|---|---|---|
| KR | 10-2007-0117465 A | 12/2007 | |
| KR | 10-2014-0041804 A | 4/2014 | |
| KR | 10-2016-0102147 A | 8/2016 | |
| KR | 10-2016-0119269 A | 10/2016 | |
| WO | 2012-002380 A1 | 1/2012 | |

* cited by examiner

[FIG. 1]
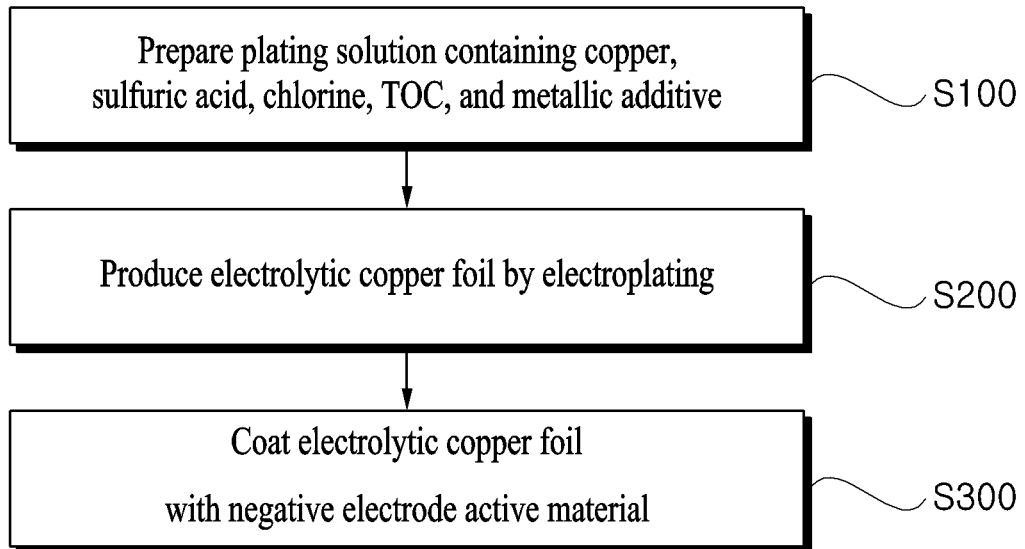
[FIG. 2]
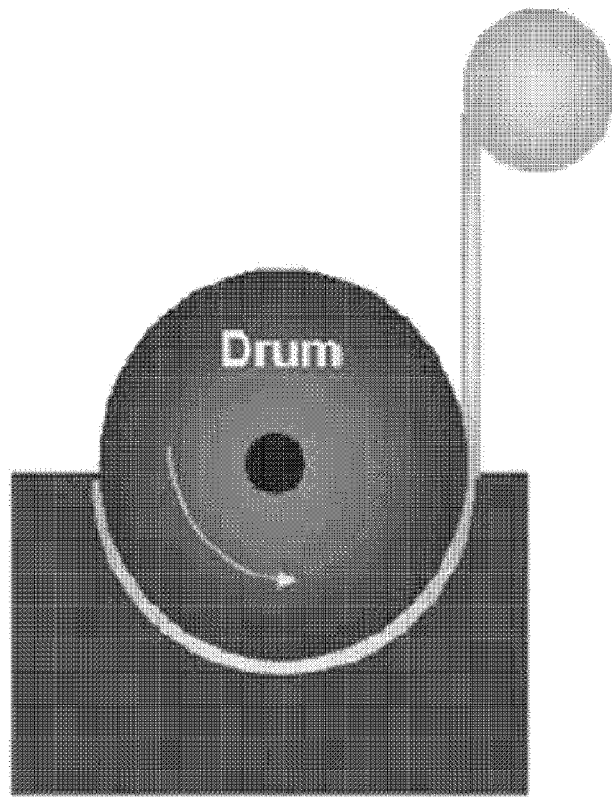

ELECTROLYTIC COPPER FOIL FOR SECONDARY BATTERY AND METHOD FOR PRODUCING THE SAME

CROSS-REFERENCE TO PRIOR APPLICATIONS

This application is a national Stage Patent Application of PCT International Patent Application No. PCT/KR2017/003360, filed on Mar. 28, 2017 under 35 U.S.C. § 371, which claims priority of Korean Patent Application No. 10-2016-0150350, filed on Nov. 11, 2016, which are all hereby incorporated by reference in their entirety.

TECHNICAL FIELD

The present invention relates to an electrolytic copper foil for a secondary battery and a method of producing the same, and more particularly, to an electrolytic copper foil for a secondary battery, which has little change in a physical property of a copper foil before and after vacuum drying in a process of producing an electrolytic copper foil, thereby exhibiting excellent cycle life in a battery test at a high-density negative electrode, and preventing cracking, and a method of producing the same.

BACKGROUND ART

In general, an electrolytic copper foil is widely used as a basic material of a Printed Circuit Board (PCB) used in electric/electronic industrial fields, and demands thereof are rapidly increasing for small-sized products, such as a thin-type notebook computer, a Personal Digital Assistant (PDA), an e-book player, an MP3 player, a next-generation portable phone, and an ultra-thin flat panel display. Further, the electrolytic copper foil is widely used as a negative electrode current collector of a secondary battery by improving a physical property thereof.

In general, the electrolytic copper foil is generated by an electrolysis method and is produced in an electrolytic bath including a cylindrical negative electrode (which is also called a "drum") made of titanium, a positive electrode, which maintains a predetermined interval with the negative electrode and is made of titanium coated with a lead alloy or an iridium oxide, an electrolyte, and a power source of a current. The electrolyte is formed of sulfuric acid and/or copper sulphate, and when a direct current is made to flow between the negative electrode and the positive electrode while rotating the cylindrical negative electrode, copper is electrodeposited in the negative electrode, thereby continuously producing the electrolytic copper foil. As described above, a process of reducing copper ions to a metal by the electrolysis method is referred to as a foil producing process.

Next, the copper foil obtained by the foil producing process may be subjected to an additional surface treatment process, such as a roughness treatment process (which is also called a nodule treatment process) for improving adhesion with an insulating substrate, a diffusion preventing treatment for preventing diffusion of the copper ions, an anticorrosion treatment for preventing oxidation of the copper foil from the outside, and a chemical adhesion improving treatment for supplementing adhesion with the insulating substrate as necessary. When the surface treatment process passes, the copper foil becomes the copper foil for a low profile printed circuit, and when only the anticorrosion treatment is performed among the surface treatment processes, the copper foil becomes the copper foil for the secondary battery.

When the electrodeposited copper foil is used for the printed circuit, the copper foil is surface treated and then is supplied to a PCB processing company in the form (a laminated form) of being attached to the insulating substrate. In contrast to this, when the electrodeposited copper foil is used for a secondary battery, the copper foil passes only the anticorrosion treatment and is supplied to a secondary battery producing company.

When the electrolytic copper foil is used as a negative electrode current collector for a secondary battery, the copper foil is used by coating both surfaces of the copper foil with an electrode active material. In this case, when intensities of illumination of both surfaces of the electrolytic copper foil are different, a battery characteristic is changed, so that it is necessary to maintain the same or similar level of the intensities of illumination of both surfaces of the electrolytic copper foil.

In the process of producing a secondary battery by using the electrolytic copper foil, the copper foil passes a vacuum drying step, and the vacuum drying is a process performed at a high temperature for a long time, so that there is a problem in that adhesion and stress between the copper foil and the active material coated surface are changed in the step of vacuum drying the copper foil, thereby degrading life of the battery and generating cracking.

Accordingly, there has been a demand for an electrolytic copper foil for a secondary battery which is capable of minimizing a change in a physical property even after a long period of time at a high temperature so as not to affect life and performance of the battery even after the vacuum drying process.

DISCLOSURE

Technical Problem

The present invention relates to an electrolytic copper foil for a secondary battery, in which Total Organic Carbon (TOC), and zinc and iron which are metallic additives are made to be contained in a copper electrolyte by predetermined contents, thereby minimizing changes in a grain size and a crystal structure and improving life of a battery, and a method of producing the same.

Further, the present invention relates to an electrolytic copper foil for a secondary battery, which minimizes a change in a physical property of a copper foil even after vacuum drying when an electrolytic copper foil is produced, thereby improving cycle life and a characteristic of the battery and preventing cracking, and a method of producing the same.

Technical Solution

According to one aspect of the present invention, exemplary embodiments of the present invention include an electrolytic copper foil for a secondary battery produced from a plating solution containing Total Organic Carbon (TOC), zinc, and iron by using a drum, in which a ratio of the TOC to the zinc and the iron contained in the electrolytic copper foil follows Formula 1 below:

$$\text{TOC}/(\text{zinc}+\text{iron}) = 1.3 \text{ to } 1.5 \qquad \text{Formula 1}$$

The electrolytic copper foil may be vacuum dried after a negative electrode active material is applied, a ratio of tensile strength and elongation percentages before and after vacuum drying may follow Formula 2 below:

((tensile strength after vacuum drying/tensile strength before vacuum drying)/(elongation percentage after vacuum drying/elongation percentage before vacuum drying)×tensile strength after vacuum drying=28 to 50 kgf/mm².   Formula 2

A ratio of tensile strength after vacuum drying to tensile strength before vacuum drying may follow Formula 3 below:

Tensile strength after vacuum drying/tensile strength before vacuum drying=0.8 to 1.01   Formula 3

A ratio of an elongation percentage after vacuum drying to an elongation percentage before vacuum drying may follow Formula 4 below:

Elongation percentage after vacuum drying/elongation percentage before vacuum drying=0.9 to 1.4   Formula 4

A concentration of the TOC contained in the plating solution may be equal to or larger than 100 ppm.

Tensile strength of the electrolytic copper foil at a room temperature may be 40 kgf/mm² to 51 kgf/mm².

A thickness of the electrolytic copper foil may be 4 μm to 12 μm.

An elongation percentage of the electrolytic copper foil may be 2% to 18%.

According to another aspect of the present invention, exemplary embodiments of the present invention include a method of producing an electrolytic copper foil for a secondary battery, the method including: (1) preparing a plating solution containing copper, Total Organic Carbon (TOC), zinc, and iron; (2) applying a current density of 30 Ampere per Square Deci-metre (ASD) to 150 ASD under a temperature condition of 30° C. to 70° C. and performing electroplating by using a drum; and (3) vacuum drying an electrolytic copper foil formed by the electroplating, in which a ratio of the TOC to the zinc and the iron contained in the electrolytic copper foil follows Formula 1 below:

TOC/(zinc+iron)=1.3 to 1.5   Formula 1

A ratio of tensile strength to elongation percentages before and after vacuum drying may follow Formula 2 below:

((tensile strength after vacuum drying/tensile strength before vacuum drying)/(elongation percentage after vacuum drying/elongation percentage before vacuum drying)×tensile strength after vacuum drying=28 to 50 kgf/mm².   Formula 2

Tensile strength of the electrolytic copper foil at a room temperature may be 40 kgf/mm² to 51 kgf/mm².

A thickness of the electrolytic copper foil may be 4 μm to 12 μm.

An elongation percentage of the electrolytic copper foil may be 2% to 18%.

Advantageous Effects

According to the present invention, TOC, and zinc and iron which are metallic additives are contained in a copper electrolyte by predetermined contents, so that it is possible to minimize changes in a grain size and a crystal structure and improve life of a battery.

In addition, according to the present invention, a change in a physical property of a copper foil is minimized even after vacuum drying when an electrolytic copper foil is produced, so that it is possible to improve cycle life and a characteristic of the battery and prevent cracking.

DESCRIPTION OF DRAWINGS

FIG. 1 is a flowchart illustrating a method of producing an electrolytic copper foil for a secondary battery according to an exemplary embodiment of the present invention.

FIG. 2 is a diagram illustrating an operation of producing an electrolytic copper foil by using a drum according to an exemplary embodiment of the present invention.

BEST MODE

Other specific matters of the exemplary embodiment are included in the detailed description and the drawings.

Advantages and characteristics, and a method for achieving them will be clear when exemplary embodiments described in detail with reference to the accompanying drawings are referred to. However, the present invention is not limited to exemplary embodiments disclosed herein but will be implemented in various forms, and the exemplary embodiments are provided so that the present invention is completely disclosed, and a person of ordinary skilled in the art can fully understand the scope of the present invention, and the present invention will be defined only by the scope of the appended claims. Further, in the drawing, a part irrelevant to the present invention is omitted for clearness of the description of the present invention, and like reference numerals designate like elements throughout the specification.

Hereinafter, the present invention will be described with reference to the accompanying drawings.

Next, an electrolytic copper foil for a secondary battery according to an exemplary embodiment of the present invention will be described in more detail.

An electrolytic copper foil for a secondary battery according to an exemplary embodiment of the present invention is an electrolytic copper foil for a secondary battery produced by using a drum, and the electrolytic copper foil is vacuum dried after an application of a negative electrode active material, and a ratio of tensile strength and elongation percentages before and after the vacuum drying may be Formula 2 below.

((Tensile strength after vacuum drying/tensile strength before vacuum drying)/(elongation percentage after vacuum drying/elongation percentage before vacuum drying)×tensile strength after vacuum drying=28 to 50 kgf/mm².   Formula 2

Further, a ratio of tensile strength after the vacuum drying to tensile strength before the vacuum drying may be Formula 3 below, and a ratio of the elongation percentage after the vacuum drying to the elongation percentage before the vacuum drying may be Formula 4 below.

Tensile strength after vacuum drying/tensile strength before vacuum drying=0.8 to 1.0   Formula 3

Elongation percentage after vacuum drying/elongation percentage before vacuum drying=0.9 to 1.4   Formula 4

In a process of vacuum drying the electrolytic copper foil in a battery producing battery, a grain size and a crystal structure of the electrolytic copper foil are changed when the electrolytic copper foil is left for a long period of time at a high temperature, and the changes in the grain size and the crystal structure of the electrolytic copper foil causes exfoliation of the active material and cracking when a battery is charged/discharged in the future and degrades life of the battery. Accordingly, when a change in a physical property of the electrolytic copper foil is minimal even after the vacuum drying, it is possible to achieve excellent life of the battery.

In the present invention, in order to minimize a change in a physical property of the copper foil even after the vacuum drying, TOC is contained in the electrolyte by a content of 100 ppm or more, so that even when the copper foil is vacuum dried for a long time at a high temperature, it is possible to prevent the grain from being abnormally grown and the crystal structure from being changed.

TOC is an abbreviation of total organic carbon and refers to total organic carbon, and means the amount of carbon in an organic material contained in the plating solution, and is contained in a copper electrolyte to serve to decrease a grain size. In the case where dissolved carbon dioxide referred to as Total Inorganic Carbon (TIC), not the TOC, is contained in the copper electrolyte or carbon adsorbed to copper ions is present in the copper electrolyte, when the copper foil is left for a long time at a high temperature due to vacuum drying, additives present in an intercrystalline are diffused to a grain boundary to cause abnormal growth of the grain and a change in the crystal structure. The change in the physical property of the copper foil exhibited after the vacuum drying causes the change in adhesion and stress with the active material coated surface, thereby causing exfoliation of the active material and cracking during the charging/discharging of a battery.

Accordingly, in the present invention, TOC of 100 ppm or more is made to be contained in a copper electrolyte so as to prevent a physical property of a copper foil after vacuum drying from being changed and optimize the copper foil, thereby improving cycle life and a characteristic of a battery when the battery is tested at a high-density negative electrode.

Ratios between tensile strength and elongation percentages before and after vacuum drying of the electrolytic copper foil for the secondary battery according to the present invention may be the ranges of Formulae 2 to 4, and when the values of the ratios between tensile strength and the elongation percentages before and after the vacuum drying are out of the ranges, adhesion and stress with the active material coated surface in the copper foil are changed, so that battery performance may be degraded.

FIG. 1 is a flowchart illustrating a method of producing an electrolytic copper foil for a secondary battery according to an exemplary embodiment of the present invention. Referring to FIG. 1, a method of producing an electrolytic copper foil for a secondary battery according to the present invention includes: (1) preparing a plating solution containing copper ions ($Cu^{2+}$) of 60 g/L to 140 g/L, sulfuric acid of 70 g/L to 200 g/L, chlorine of 10 ppm to 90 ppm, TOC of 100 ppm or more, and zinc and iron as metallic additives (S100); (2) applying a current density of 30 Ampere per Square Deci-metre (ASD) to 150 ASD under a temperature condition of 30° C. to 70° C. and performing electroplating by using a drum (S200); and (3) vacuum drying an electrolytic copper foil formed by the electroplating (S300).

In operation (1) (S100), as the operation of preparing the plating solution, the plating solution containing copper ions ($Cu^{2+}$) of 60 g/L to 140 g/L, sulfuric acid of 70 g/L to 200 g/L, chlorine of 10 ppm to 90 ppm, TOC of 100 ppm or more, and zinc and iron as metallic additives is prepared. In the plating solution, the TOC serves to minimize a change in a grain size and a crystal structure of the electrolytic copper foil even when the electrolytic copper foil is maintained for a long time at a high temperature in the operation of vacuum drying, which is to be performed after the production of the electrolytic copper foil. In the present invention, the electrolytic copper foil is produced by containing the TOC of 100 ppm or more in the plating solution, so that it is possible to minimize a change of a grain size and a crystal structure even when the electrolytic copper foil is left for a long time at a high temperature during vacuum drying, thereby preventing exfoliation of an active material and cracking when the battery is charged/discharged in the future.

Further, in the present invention, in order to minimize a change in the physical property of the electrolytic copper foil after the vacuum drying, zinc and iron are further contained as the metallic additives, in addition to the TOC. The electrolytic copper foil may be produced by electroplating the plating solution, and the TOC may be contained in the plating solution by a predetermined content, the zinc may be contained by 50 mg/L to 700 mg/L, and the iron may be contained by 400 mg/L to 1100 mg/L.

In the electrolytic copper foil formed by electroplating the plating solution containing the TOC, the zinc, and the iron, the content of the TOC may be 100 ppm or more, and the contents of the zinc and the iron contained may correspond to Formula 1 below.

When the electrolytic copper foil is produced by electroplating the plating solution, concentrations of the additives, for example, the TOC, the zinc, and the iron, contained in the plating solution are not always the same as those of the electrolytic copper foil produced by the electroplating, but may be the same as or smaller than those of the electrolytic copper foil produced by the electroplating.

The zinc and the iron flatten a surface of the electrolytic copper foil by adjusting a plating speed of copper during the electroplating, and control an excessive increase in the carbon content in the electrolytic copper foil. Accordingly, when a ratio of the TOC to the zinc and the iron within the electrolytic copper foil is within the range of Formula 1 below, a change in the physical property of the electrolytic copper foil after the vacuum drying is minimized.

$$\mathrm{TOC}/(\mathrm{zinc}+\mathrm{iron})=1.3 \text{ to } 1.5 \qquad \text{Formula 1}$$

When the ratio is less than 1.3, the contents of the zinc and the iron added to the plating solution are increased to prevent the TOC within the plating solution from preventing the abnormal growth of the grain, so that the ratio less than 1.3 is not preferable, and when the ratio is greater than 1.5, stress is generated within the grain due to the excessive content of the TOC within the electrolytic copper foil, so that when the electrolytic copper foil is exposed to a high temperature during the vacuum drying, the grain within the electrolytic copper foil is abnormally grown and the change in the physical property after the vacuum drying may become severe. Accordingly, in order to minimize the change in the grain size and the crystal structure even though the electrolytic copper foil is exposed to a high temperature for a long time, it is preferable that the ratio of the TOC to the zinc and the iron is maintained within the range of 1.3 to 1.5 as expressed in Formula 1.

When the copper ions and the sulfuric acid ions in the plating solution are out of the range, there is a problem in that the copper foil is not properly precipitated or hardness of the copper foil is degraded in the subsequently performed electroplating.

In addition, chlorine of 10 ppm to 90 ppm is contained in the plating solution, and the chlorine suppresses crystal growth of a precipitate of $CuCl_2$ formed on a grain boundary interface during the electroplating when the precipitate is heated at a high temperature to improve thermal stability at a high temperature. When a concentration of the chlorine is out of the range of 10 ppm to 90 ppm, tensile strength of the electrolytic copper foil may be degraded and thermal stability of the electrolytic copper foil at a high temperature may be degraded.

In operation (2) (S200), a current density of 30 ASD to 150 ASD is applied the plating solution prepared in operation (1) under a temperature condition of 30° C. to 70° C., and electroplating is performed by using a drum. For reference, FIG. 2 is a diagram illustrating an operation of producing an electrolytic copper foil by using a drum according to an exemplary embodiment of the present invention. When the plating temperature and the current density are out of the foregoing ranges, the plating is not property performed, so that a surface of the electrolytic copper foil is not uniformly formed, or tensile strength and an elongation rate are degraded, thereby causing degradation of performance of a battery.

Operation (3) (S300) includes an operation of vacuum drying the electrolytic copper foil formed by the electroplating. The vacuum drying may be performed at a temperature range of 110° C. to 150° C. for 6 hours to 10 hours. When the vacuum drying temperature is out of the range, the electrolytic copper foil may not be properly dried or the electrolytic copper foil may be transformed due to a high temperature. Further, when the vacuum drying time is less than 6 hours, the electrolytic copper foil may not be completely dried, and when the vacuum drying time is longer than 10 hours, performance of the electrolytic copper foil may be degraded due to excessive drying.

Further, tensile strength of the electrolytic copper foil for the secondary battery according to the present invention at a room temperature may be 40 kgf/mm$^2$ to 51 kgf/mm$^2$. When the tensile strength is less than 40 kgf/mm$^2$, there may be a problem in that the electrolytic copper foil is fractured and the positive electrode and the negative electrode are short-circuited. When the secondary battery is charged/discharged, the secondary battery is expanded or contracted in a process where other active materials, such as graphite, transceive lithium ions, and in this case, an active material layer is in close contact with the electrolytic copper foil, so that stress is generated due to the expansion or the contraction. Accordingly, when the tensile strength is less than 40 kgf/mm$^2$, the electrolytic copper foil cannot resist the stress and is fractured, so that it is impossible to maintain performance of the battery, and the electrolytic copper foil is transformed due to the fracture, so that there is a problem in that the positive electrode and the negative electrode are short-circuited.

Further, a thickness of the electrolytic copper foil for the secondary battery according to the present invention may be 4 μm to 12 μm. When the thickness of the electrolytic copper foil is less than 4 μm, the electrolytic copper foil may be easily fractured due to the small thickness, and when the thickness of the electrolytic copper foil is larger than 12 μm, a volume and weight of a produced secondary battery are increased, so that the thickness of the electrolytic copper foil larger than 12 μm is not preferable.

Further, an elongation percentage of the electrolytic copper foil for the secondary battery according to the present invention may be 2 to 18%. When the elongation percentage of the electrolytic copper foil is large, the electrolytic copper foil resists tension when the active material is coated in an electrode manufacturing process to prevent the electrolytic copper foil from being fractured in the process, and it is possible to prevent the electrolytic copper foil from being fractured due to stress applied in a process of winding an electrode. In addition, during a charging/discharging cycle of the battery, the battery is prevented from efficiency degradation and from being fractured to improve performance of the battery. However, when the elongation percentage is larger than 18%, the secondary battery is considerably transformed during the charging/discharge to cause a short circuit, and when the elongation percentage is less than 2%, the electrolytic copper foil may be easily fractured.

The tensile strength and the elongation percentage are inversely proportional to each other, so that when the tensile strength is increased, the elongation percentage is decreased, and when the tensile strength is decreased, the elongation percentage is increased. Therefore, in order to produce the electrolytic copper foil, which is prevented from being fractured and has high tensile strength, it is important to maintain tensile strength and an elongation percentage within appropriate ranges. Accordingly, it is preferable that the tensile strength maintains 40 kgf/mm$^2$ to 51 kgf/mm$^2$, and when the elongation percentage maintains the range of 2% to 18%, it is possible to prevent the positive electrode and the negative electrode from being short-circuited when the secondary battery is transformed.

Hereinafter, Examples of the present invention and Comparative Examples will be described. However, the Examples below are simply examples of the present invention, and the scope of the present invention is not limited by the Examples.

Test of Battery Life According to TOC Concentration and Change in Physical Property Before and After Vacuum Drying

Example 1

A plating solution containing copper ions of 90 g/L, sulfuric acid of 120 g/L, chlorine of 30 ppm, TOC of 360 ppm, zinc of 0.037 g/L, and iron of 0.75 g/L (a sum of zinc and iron is 0.234 g/L) was prepared, and electroplating was performed at a temperature of 55° C. by applying a current density of 90 ASD by using a drum. Then, an electrolytic copper foil formed by the electroplating was vacuum dried at 120° C. for 7 hours.

Examples 2 to 8

Electrolytic copper foils were produced by the same manner as that of Example 1, except for concentrations of TOC and the amounts of zinc and iron, which are represented in Tables 2 and 3 below, contained in a plating solution.

Comparative Examples 1 to 3

In Comparative Examples 1 to 3, electrolytic copper foils were produced under the same condition as that of Example 1, except for concentrations of TOC and the amounts of zinc and iron, which are represented in Tables 2 and 3 below, contained when a plating solution is prepared.

The experiment conditions of Examples 1 to 8 and Comparative Examples 1 to 3 are described above, and tensile strength and elongation percentages before vacuum drying, tensile strength and elongation percentages after vacuum drying, ratio values of the TOC to the zinc and the iron after the copper foil is melted, battery life after 300 cycles of the electrolytic copper foils for a secondary battery produced by the methods were measured and are represented in Tables 2 and 3 below.

A maximum load of tensile strength measured by collecting a tensile specimen having a width of 12.7 mm×a gauge length of 50 mm from the electrolytic copper foil obtained from each of Examples 1 to 8 and Comparative Examples 1 to 3 and performing a tensile test at a speed of a crosshead of 50.8 mm/min under the standard of IPC-TM-650 2.4.18B is referred to as tensile strength, and an elongation percentage when the electrolytic copper foil is fractured is referred to as an elongation percentage.

Further, the ratio value of the TOC to the zinc and the iron after the copper foil was melted was analyzed by melting the electrolytic copper foil obtained from each of Examples 1 to 8 and Comparative Examples 1 to 3 in hydrochloric acid (35%) of 60 ml and hydrogen peroxide solution (30%) of 40 ml and then using Inductively Coupled Plasma (ICP) mass spectrometry. The ratio value of the TOC to the zinc and the iron is calculated by using Formula 1 below, and a result of the calculation is represented in Table 3 below.

The experiment was performed under a battery evaluation condition below, and the experiment was performed under conditions of a cell design, a positive electrode, a negative electrode, a separator, and an electrolyte, which are represented in Table 1 below.

Constant current charging: Current value of 1 C, charging termination voltage of 4.2 V
  Pause for 20 minutes
  Constant current discharging: Current value of 1 C, charging termination voltage of 2.5V cut off
  1 C=487 mAh
  Cycle: Evaluation after 30 cycles, temperature of 55° C.

TABLE 1

| Major category | Minor category | Unit | Battery configuration |
|---|---|---|---|
| Cell design | Size | mm | 34 × 50 |
| | Capacity | mAh | 487 |
| | Current density | mAh/cm² | 3.06 |
| | N/P ratio | — | 1.10 |
| Positive electrode | Active material | — | LCO |
| | Composition | Active material:conductive material:binder | 92:4:4 |
| | L/L | mg/cm² | 21.72 |
| | Mixture density | g/cm³ | 3.0 |
| Negative electrode | Active material | — | Natural graphite |
| | Composition | Active material:thickner:binder | 96:2:2 |
| | L/L | mg/cm² | 9.00 |
| | Mixture density | g/cm³ | 1.50 |
| Separator | Material | — | PE |
| | Thickness | μm | 16 |
| Electrolyte | Salt | — | 1.0M LiPF$_6$ |
| | Solvent | — | EC:EMC = 3:7 |
| | Additive | — | VC 3% |
| | Liquid measure | ∝ | 2.0 |

TABLE 2

| Category | Thickness (μm) | Tensile strength before VD (kgf/mm²) | Elongation percentage before VD (%) | Tensile strength after VD (kgf/mm²) | Elongation percentage after VD (%) |
|---|---|---|---|---|---|
| Example 1 | 4 | 43.7 | 3.2 | 41.9 | 3.8 |
| Example 2 | 6 | 49.7 | 6.6 | 43.5 | 8.1 |
| Example 3 | 6 | 50.1 | 7.2 | 48.4 | 7.0 |
| Example 4 | 8 | 43.4 | 8.0 | 40.5 | 8.6 |
| Example 5 | 10 | 41.3 | 11.8 | 39.5 | 10.7 |
| Example 6 | 10 | 49.2 | 10.5 | 44.8 | 10.9 |
| Example 7 | 12 | 44.7 | 7.3 | 41.6 | 9.1 |
| Example 8 | 12 | 43.4 | 18 | 40.9 | 18.1 |
| Comparative Example 1 | 6 | 35.1 | 6.2 | 25.7 | 6.2 |
| Comparative Example 2 | 8 | 33.0 | 10.1 | 28.8 | 9.8 |
| Comparative Example 3 | 10 | 33.0 | 12.4 | 28.6 | 17.2 |

TABLE 3

| Category | Tensile strength after VD/Tensile strength before VD | Elongation percentage after VD/Elongation percentage before VD | (Tensile strength after VD/Tensile strength before VD)/(Elongation percentage after VD/Elongation percentage before VD) × tensile strength after VD (Kgf/mm²) | Concentration of TOC in the plating solution | TOC (zinc + iron) after melting copper foil | Battery life after 300 cycles |
|---|---|---|---|---|---|---|
| Example 1 | 0.95 | 1.18 | 33.52 | 360 | 1.48 | 88.3 |
| Example 2 | 0.87 | 1.22 | 30.88 | 344 | 1.48 | 87.4 |
| Example 3 | 0.96 | 0.97 | 47.9 | 450 | 1.42 | 88.5 |
| Example 4 | 0.93 | 1.07 | 35.23 | 1080 | 1.43 | 87.8 |
| Example 5 | 0.95 | 0.90 | 41.47 | 650 | 1.35 | 88.2 |
| Example 6 | 0.91 | 1.03 | 39.42 | 350 | 1.45 | 88.6 |
| Example 7 | 0.93 | 1.24 | 31.20 | 680 | 1.30 | 87.4 |
| Example 8 | 0.94 | 1.00 | 38.44 | 100 | 1.50 | 87.1 |
| Comparative Example 1 | 0.73 | 1.00 | 18.76 | 79 | 1.11 | 82.9 (fracture or peeling) |
| Comparative Example 2 | 0.87 | 0.97 | 25.63 | 98 | 1.21 | 85.4 (fracture or peeling) |
| Comparative Example 3 | 0.86 | 1.38 | 17.73 | 69 | 1.08 | 81.8 (fracture or peeling) |

Referring to Tables 2 and 3, in Comparative Examples 1 to 3, in which the TOC concentrations are less than 100 ppm, it can be seen that all of the values of (tensile strength after vacuum drying/tensile strength before vacuum drying)/(elongation percentage after vacuum drying/elongation percentage before vacuum drying) of Formula 2 are less than 28, which is low. However, in Examples 1 to 8, in which the TOC concentrations are all 100 ppm or greater, it can be seen that all of the values of (tensile strength after vacuum drying/tensile strength before vacuum drying)/(elongation percentage after vacuum drying/elongation percentage before vacuum drying) of Formula 2 are within the range from 28 to 50. When the electrolytic copper foil is produced, the vacuum drying is performed at a high temperature of 100° C. or higher for a long time, so that a grain size and a crystal structure within the electrolytic copper foil may be changed due to the high temperature, and the change in physical properties of the electrolytic copper foil may cause the degradation of battery life. The TOC serves to prevent the physical properties of the electrolytic copper foil from being changed, so that when the TOC is maintained with a concentration of 100 ppm or more like Examples 1 to 8, the change in physical properties is little even after the high-temperature vacuum drying process is performed, and thus it can be seen that battery life is excellent.

Further, in Comparative Examples 1 to 3, in which all of the ratios of TOC/(zinc+iron) are less than 1.3, it can be seen that the changes in physical properties before and after vacuum drying are exhibited greater than those of Examples 1 to 8, and battery life is very short. In the case where the ratio of TOC/(zinc+iron) is equal to or less than 1.3, the content of metallic additive is increased to cause the TOC within the plating solution to prevent the abnormal growth of the grain, so that it seems that the change in physical properties of the electrolytic copper foil after vacuum drying is considerable.

In addition, in Table 3, the batteries according to Examples 1 to 8 and Comparative Examples 1 to 3, in which capacities were checked after 300 cycles, were disassembled for checking states of the electrolytic copper foils (acting as negative electrode plates). In this case, it can be seen that the electrolytic copper foils according to Examples 1 to 8 have the same appearances as the first appearances without appearance defects. Meanwhile, in Comparative Examples 1 to 3, it can be seen that a part of the electrolytic copper foil is fractured or peeled, and in the case of Comparative Example 1, it can be seen that there is a portion in which the negative electrode active material is peeled from the electrolytic copper foil, and in Comparative Examples 2 and 3, it can be seen that a fractured portion is formed on an external portion of the electrolytic copper foil.

It will be understood by those skilled in the art that various changes in a specific form and details may be made therein without the change of the technical spirit or the essential features of the present invention. Thus, it is to be appreciated that the embodiments described above are intended to be illustrative in every sense, and not restrictive. The scope of the present invention is represented by the scope of the claims described below rather than the detailed description, and it shall be construed that all of the changes or modified forms derived from the meanings and the scope of the claims, and the equivalent concept thereof are included in the scope of the present invention.

The invention claimed is:

1. An electrolytic copper foil for a secondary battery, comprising:
   a first layer that contains total organic carbon (TOC) and metallic additives that contain zinc, and iron,
   wherein the first layer is produced from a plating solution containing TOC, zinc, and iron by using a drum, and wherein a concentration of the TOC contained in the plating solution is in a range of 450 ppm-1080 ppm,
   wherein a ratio of the TOC to the zinc and the iron contained in the first layer follows Formula 1 below:

$$TOC/(zinc+iron)=1.3 \text{ to } 1.5. \qquad \text{Formula 1}$$

2. The electrolytic copper foil of claim 1, wherein a negative electrode active material is applied to the first layer and wherein, upon performing a vacuum drying process to the electrolytic copper foil having the negative electrode active material, a ratio of tensile strength and elongation percentages of the electrolytic copper foil having the negative electrode active material before and after the vacuum drying process follows Formula 2 below:

$$((\text{tensile strength after vacuum drying/tensile strength before vacuum drying})/(\text{elongation percentage after vacuum drying/elongation percentage before vacuum drying}) \times \text{tensile strength after vacuum drying})=28 \text{ to } 50 \text{ kgf/mm}^2, \text{ and} \qquad \text{Formula 2}$$

wherein the vacuum drying process is performed at a temperature range of 110° C. to 150° C. for 6 hours to 10 hours.

3. The electrolytic copper foil of claim 1, wherein, upon performing a vacuum drying process to the electrolytic copper foil, a ratio of tensile strength after the vacuum drying process to tensile strength before the vacuum drying process follows Formula 3 below:

$$\text{Tensile strength after vacuum drying/tensile strength before vacuum drying}=0.8 \text{ to } 1.01, \text{ and} \qquad \text{Formula 3}$$

wherein the vacuum drying process is performed at a temperature range of 110° C. to 150° C. for 6 hours to 10 hours.

4. The electrolytic copper foil of claim 1, wherein, upon performing a vacuum drying process to the electrolytic copper foil, a ratio of an elongation percentage after the vacuum drying process to an elongation percentage before the vacuum drying process follows Formula 4 below:

$$\text{Elongation percentage after vacuum drying/elongation percentage before vacuum drying}=0.9 \text{ to } 1.4, \text{ and} \qquad \text{Formula 4}$$

wherein the vacuum drying process is performed at a temperature range of 110° C. to 150° C. for 6 hours to 10 hours.

5. The electrolytic copper foil of claim 1, wherein tensile strength of the electrolytic copper foil at room temperature is 39.5 kgf/mm$^2$ to 48.4 kgf/mm$^2$.

6. The electrolytic copper foil of claim 1, wherein a thickness of the electrolytic copper foil is 4 μm to 12 μm.

7. The electrolytic copper foil of claim 1, wherein an elongation percentage of the electrolytic copper foil is 2% to 18%.

8. The electrolytic copper foil of claim 1, wherein a negative electrode active material is applied to the first layer and wherein, upon performing a vacuum drying process to the electrolytic copper foil having the negative electrode active material, a ratio of tensile strength and elongation percentages of the electrolytic copper foil having the nega tive electrode active material before and after the vacuum drying process follows Formula 2 below:

((tensile strength after vacuum drying/tensile strength before vacuum drying)/(elongation percentage after vacuum drying/elongation percentage before vacuum drying)×tensile strength after vacuum drying)=28 to 50 kgf/mm².     Formula 2

9. The electrolytic copper foil of claim 1, wherein, upon performing a vacuum drying process to the electrolytic copper foil, a ratio of tensile strength after the vacuum drying process to tensile strength before the vacuum drying process follows Formula 3 below:

Tensile strength after vacuum drying/tensile strength before vacuum drying=0.8 to 1.01.     Formula 3

10. The electrolytic copper foil of claim 1, wherein, upon performing a vacuum drying process to the electrolytic copper foil, a ratio of an elongation percentage after the vacuum drying process to an elongation percentage before the vacuum drying process follows Formula 4 below:

Elongation percentage after vacuum drying/elongation percentage before vacuum drying=0.9 to 1.4.     Formula 4

\* \* \* \* \*